Figure 1:
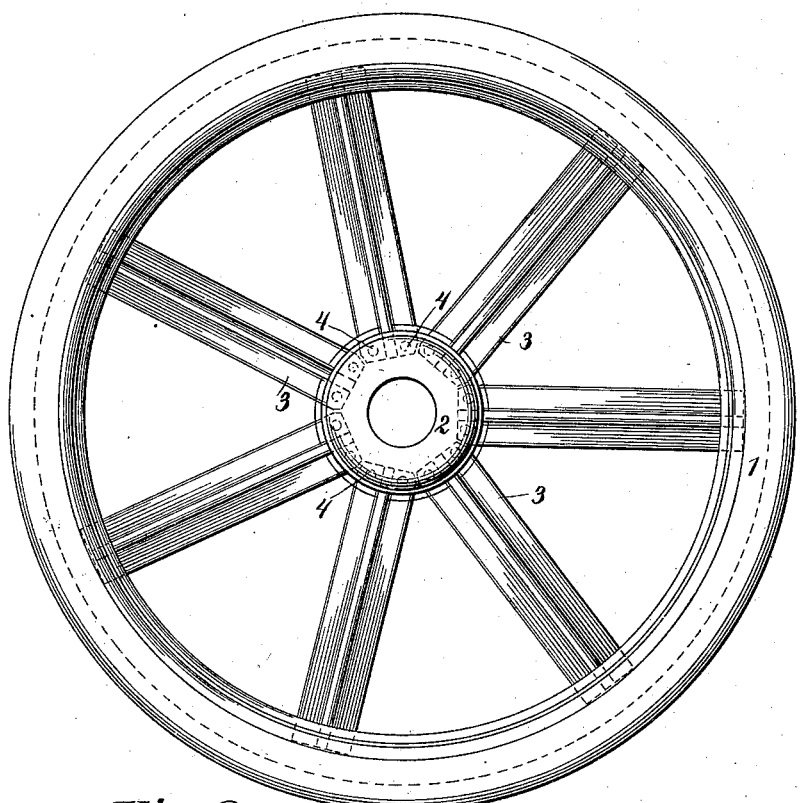

No. 628,694. F. E. CANDA. Patented July 11, 1899.
CAR WHEEL.
(Application filed May 26, 1898.)

(No Model.)

WITNESSES:

INVENTOR

Ferdinand E. Canda

BY

ATTORNEY

UNITED STATES PATENT OFFICE.

FERDINAND E. CANDA, OF NEW YORK, N. Y.

CAR-WHEEL.

SPECIFICATION forming part of Letters Patent No. 628,694, dated July 11, 1899.

Application filed May 26, 1898. Serial No. 681,760. (No model.)

*To all whom it may concern:*

Be it known that I, FERDINAND E. CANDA, a citizen of the United States, residing at New York, in the county of New York and State of New York, have invented certain new and useful Improvements in Car-Wheels; and I do hereby declare the following to be a full, clear, and exact description of the invention, such as will enable others skilled in the art to which it appertains to make and use the same.

My invention relates to car-wheels, and resides in a modification of the car-wheel covered by my patent for a car-wheel, No. 605,391, dated June 7, 1898. The car-wheel illustrated and described in said patent consists of a cast-steel rim and hub connected by wrought-iron or steel spokes formed separately from the hub and rim and welded into the hub and rim during the casting of the wheel by the heat of the molten metal and the pressure produced by the solidification and shrinkage thereof. The wheel so made is exceedingly strong and is capable of carrying heavy loads and of withstanding severe shocks and stresses, and because of the material of which its rim is composed it is able to withstand the friction of the brake-shoes or the friction due to "skidding" upon the track with less wear than the chilled cast-iron wheels at present in use. For some purposes, however, the great strength of the wheel described in my said Patent No. 605,391 is not required, and it is desirable to employ a wheel which may be made more cheaply, but which has the same power to resist wear. Wheels which are to be used under comparatively light cars which are not run at a high rate of speed do not require as great strength as wheels which are to be used under heavier cars which are run at a high rate of speed, and the "trailer" cars of street-railways need not be as strong as the wheels of motor-cars.

My present invention consists in making a car-wheel with a cast-steel rim and a hub composed of cast-iron or other suitable metal, the rim and hub being connected by wrought-iron or steel spokes which are welded into the rim, but are merely held mechanically by the hub.

The object of my invention is to provide a car-wheel composed principally of steel and having its spokes and rim welded together, which is capable of enduring a large amount of wear and may be constructed cheaply. This object is attained in the invention herein described and illustrated in the drawings which accompany and form a part of this specification, in which the same reference-numerals indicate the same or corresponding parts, and in which—

Figure 2:
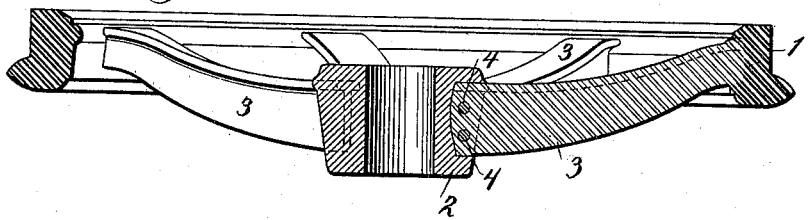

Figure 1 is an elevation of a car-wheel embodying my invention, and Fig. 2 is a diametral section of the wheel.

In the drawings, 1 is the rim of the wheel, and 2 the hub.

3 3 are the spokes, formed of wrought-iron or mild steel and the ends of which project into the rim 1 and hub 2, respectively, and are welded into the rim, so as to be substantially integral therewith, and are held mechanically in the hub by the shrinkage of the molten metal about their ends during the casting of the hub.

In making the wheel a mold is made as if the wheel were to be cast entire, separate gates, risers, and vents, however, being provided for the rim and hub molds. The spokes formed by cutting beams of structural wrought-iron or steel into proper lengths and bending and tapering the blanks, if desired, are then placed within the mold in the recesses formed by the spokes of the pattern, their ends projecting into the rim and hub molds. Before placing the spokes into the mold their ends are covered with a protecting-glaze formed by borax or other suitable material. The mold is then closed, and when convenient is poured, molten steel of a suitable quality being poured into the rim-mold first, and after the metal of the rim has set and most of the shrinkage toward the center of the wheel has taken place molten iron being poured into the hub-mold. The molten steel for the rim is poured at a temperature enough higher than that actually required to permit the metal to fill the mold, to overcome the tendency of the spokes to chill the metal about their ends, and to raise the ends of the spokes to a welding heat. The heat, together with the great pressure caused by the contraction of the metal about the ends of the spokes, welds the spokes into the rim. The metal of the hub holds the spokes firmly by reason of the contraction of the molten metal about the ends of the spokes. Preferably the inner ends of the spokes are provided with locking-holes 4 4, as shown, so that the molten metal by filling these holes may positively interlock the spokes with the hub.

After the wheel has cooled it is annealed at a cherry-red heat to remove the brittleness of the cast-steel, to relieve internal stresses, and to restore the metal of the spokes to its original condition.

In stating in the above description and in one of the following claims that the spokes are connected mechanically to the hub I mean that the spokes are firmly secured to the hub without actual uniting of the metal of the spokes and hub, as would be the case were the spokes welded into the hub as they are into the rim.

Having thus completely described my invention, what I claim, and desire to secure by Letters Patent, is—

1. A car-wheel having a cast-steel rim, a series of spokes formed separately from the rim, from a tough welding metal, and welded into the rim, and a hub composed of cast-iron or other suitable material, inclosing the ends of the spokes, substantially as described.

2. A car-wheel having a cast-steel rim, a series of spokes formed separately from the rim, from a tough welding metal, and welded into the rim, and a hub to which said spokes are connected mechanically but not integrally, substantially as described.

In testimony whereof I affix my signature in presence of two witnesses.

FERDINAND E. CANDA.

Witnesses:
C. P. HAUGHITON,
H. M. MARBLE.